Patented Apr. 13, 1926.

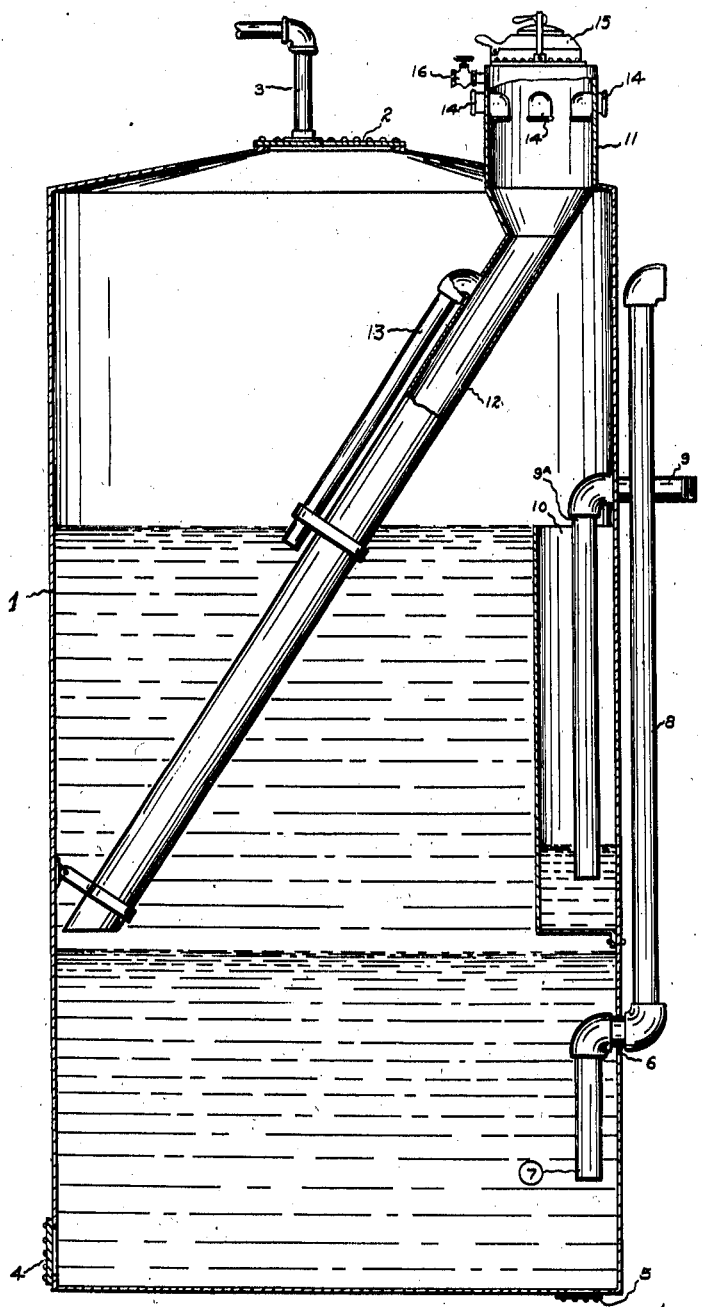

1,580,791

UNITED STATES PATENT OFFICE.

OTTO A. PETERS, OF WICHITA FALLS, TEXAS.

OIL-SETTLING TANK.

Application filed April 8, 1924. Serial No. 704,985.

*To all whom it may concern:*

Be it known that I, OTTO A. PETERS, a citizen of the United States, and a resident of Wichita Falls, in the county of Wichita and State of Texas, have invented new and useful Improvements in Oil-Settling Tanks; and I do declare the following to be a full, clear, and exact description of the same, such as will enable others skilled in the art to which it appertains to make and use the same.

My invention relates to oil settling tanks commonly known as gun barrel tanks, and it is my chief object to provide a tank of this nature that will enable only the oil having the highest gravity to pass into the storage tanks.

Another object of the invention is to provide a tank of this nature that will separate the water and allow the oil to flow into the storage tanks.

A further object is to provide an automatic water drain that will discharge the water from the tank.

Yet a further object is to provide a tank of this nature that will enable inspection of the flow into the tank without releasing the gas pressure therein.

Further objects and advantages of the invention will be apparent as the invention is more fully disclosed.

With the foregoing in view, the invention resides in the novel subject matter hereinafter described and claimed, the description being supplemented by the accompanying drawing which illustrates a central longitudinal sectional view. The various parts will now be referred to by numbers.

1 is a tank of suitable design, having a covered manhole 2 at the top thereof. 3 is a pipe attached to the cover 2 leading to a point of gas consumption. 4 and 5 are drain plugs which may be removed to clean the settlings from the bottom of the tank 1. 6 is a nipple inserted in the side of the tank 1, as shown. 7 is a pipe attached to the nipple 6, interiorly of the tank 1, and extending downward, the lower end thereof being spaced from the bottom of the tank. 8 is a pipe attached to the nipple 6, exteriorly of the tank 1, and extending upward terminating near the top of said tank. 9 is a pipe attached to the tank 1, having an interior downward extension, as shown at $9^a$. 10 is a housing attached to the side of the tank 1, surrounding the downward pipe extension $9^a$, the lower end of the housing 1 being closed and the upper end bein open. 11 is a housing inserted in the of the tank 1. 12 is a tubular men attached to the bottom of the housing 11 extending downward obliquely, as show 13 is a tubular member attached near the t of the tubular member 12 and extendin downward longitudinally thereof, the lower end of the tubular member 13 terminating a few inches below the surface of the oil in said tank, providing a liquid seal to prevent the gas in the tank 1 from passing through the housing 11 when the cover 15 is opened, and also providing means for the gas in the tubular member 12 to pass into the tank 1 when the gas pressure in the tubular member 12 exceeds the gas pressure in the tank 1. 14 are tubular members extending from the housing 11 to the producing oil wells. 15 is an inspection hole cover attached to the top of the housing 11. 16 is a valve attached to the housing 11.

The device operates in the following manner: Oil coming from the producing wells into the housing 11 through the tubular members 14 is lowered into the tank 1 through the tubular member 12, thus preventing the oil from splashing into the liquid in the tank 1, thereby retarding agitation of the oil. When it is desired to determine the quantity of oil that each well is producing, the valve 16 is opened, thereby releasing the gas pressure in the housing 11, the cover 15 is then opened, allowing the operator to see the quantity of oil flowing into the housing 11 through each of the tubular members 14, which have tubular connection with the producing wells. It will be noted that the gas in the tank 1 will not escape when the cover 15 is opened for the reason that the lower ends of the tubular members 12 and 13 are submerged below the surface of the oil in the tank, thus providing a liquid seal. The water that comes into the tank with the oil settles to the lower portion of the tank and the oil rises to the top of the water as illustrated in the drawing. When the oil level reaches the top of the housing 10 it flows therein and the gas pressure in the tank 1 forces the oil from the housing 10 through the pipe $9^a$ and 9 into storage tanks. It will be noted that oil of the highest gravity will rise to the surface, and it will also be noted that only the oil from the surface flows into the housing 10, thereby allowing only oil of the highest gravity to flow into the storage tanks. The top of the pipe 8 terminates approximately thirty inches above the top of the housing 10, or a sufficient distance above the housing 10 so as to enable the gas pressure in the tank 1 to force the water out at the top thereof.

It is believed from the foregoing description that the nature, operation and advantages of the invention will be readily apparent, however, I wish to indicate clearly that I do not limit myself to the specific construction herein shown and described, and that such changes may be resorted to, when desired, as fall within the scope of what is herein claimed.

What I claim is:

1. A separator of the character described comprising a tank, a supply pipe leading within said tank and terminating adjacent the bottom thereof, a housing supported within said tank and having its upper end open whereby when the oil within the tank rises above the upper end of said housing it may flow therein, an oil outlet pipe communicating with the lower end of said housing and leading from said tank at a point above said housing, a water outlet leading from said tank below said housing, and a gas outlet leading from the upper end of said tank.

2. An oil settling tank of the character described comprising in combination a tank, a housing arranged in the upper end of said tank, a plurality of oil inlets leading to said housing, a gas outlet leading from said housing, a tubular member extending downwardly obliquely within said tank and communicating with said housing, a liquid sealed gas outlet communicating with said tubular member, a gas outlet leading from the upper end of said tank, an oil outlet for permitting the oil of the highest specific gravity to flow therefrom, a water outlet leading from the bottom of said tank and extending upwardly above said oil outlet, substantially as and for the purpose specified.

OTTO A. PETERS.